VERTICAL TILT-OUT CHASSIS

Filed Sept. 17, 1958 2 Sheets-Sheet 1

INVENTORS.
FRANCIS P. DEVINE
AND EDWARD J. YEAGER,
BY Allen & Allen
ATTORNEYS.

VERTICAL TILT-OUT CHASSIS

Filed Sept. 17, 1958 2 Sheets-Sheet 2

INVENTORS.
FRANCIS P. DEVINE
AND EDWARD J. YEAGER,
BY Allen & Allen
ATTORNEYS.

United States Patent Office 2,994,807

Patented Aug. 1, 1961

2,994,807

VERTICAL TILT-OUT CHASSIS

Francis P. Devine and Edward J. Yeager, Cincinnati, Ohio, assignors to Avco Manufacturing Corporation, Cincinnati, Ohio, a corporation of Delaware Filed Sept. 17, 1958, Ser. No. 761,613

8 Claims. (Cl. 317—99)

The invention relates to the problem of mounting a large quantity of electrical or electronic apparatus in a cabinet, while providing for ready accessibility of all parts of the apparatus for replacement, adjustment or repair. The nature of the electrical or electronic apparatus does not form a limitation on the invention. Exemplary but non-limiting fields of utility lie in the provision of radar apparatus, electronic business machines, electronic computors and the like.

In a copending application of Devine and Reddy, entitled, The Structure of Cabinets for Electrical Apparatus, Serial No. 716,612 filed September 17, 1958, now Patent No. 2,888,308, there is described a structure comprising a cabinet having top, bottom and side members, together normally with a rear member, the cabinet being provided with one or more front panel structures which cover at least a portion of the front of the cabinet. These front panel structures are so mounted that they may be raised vertically to clear the top of the cabinet. The interior of the cabinet is fitted with one or a series of frames lying in vertical planes and so mounted as to be slidable individually forwardly out of the cabinet or rearwardly into the cabinet. The vertical removal of a front panel thus permits the forward withdrawal of one or more of these frames so that electrical or electronic apparatus mounted thereon becomes to that degree accessible for replacement, adjustment or repair at the front of the cabinet.

The present invention is useful in structures of this type and is particularly directed to the structure of mounting means for electrical or electronic apparatus within the said frames in such fashion that accessibility is increased.

A primary object of the invention will be evident from what has been said above; but an additional important object of the invention is the provision of a chassis construction which will permit the installation within a given space of a much greater number of electronic components in a more efficient manner.

The invention thus has to do with the mounting of chassis members in frame-like structures in such a way that the chassis members can be swung to positions providing more ready access and to positions in which the chassis members themselves provide a convenient worktable with very high accessibility of all parts. While the invention will be described in connection with the type of cabinet structure to which reference has been made above, it will be understood by the skilled worker in the art that the principles of the invention are not limited to the use of frames containing a large number of the chassis structures, nor are they limited to the exemplary cabinets or to cabinets having frames slidable in a vertical plane. The chassis structures hereinafter described may be used in connection with a frame or frames in any cabinet structure which is so arranged as to provide accessibility.

It is another object of the invention to provide a chassis structure comprising a main base or platform together with one or more auxiliary platforms swingable with respect thereto, whereby additional circuit elements may be included within a given amount of space while preserving accessibility.

It is an object of the invention to provide, in connection with chassis structures, for the use of separable slip-ring connectors, whereby the use of flexible conductors including plug-in connectors are avoided. This not only permits in-circuit work on the apparatus mounted on the chassis when the chassis is in various positions, but also permits entire removal and replacement of the chassis in a more efficient manner.

The above objects, and others which will be set forth hereinafter or will be apparent to one skilled in the art upon reading these specifications, are accomplished by that construction and arrangement of parts of which an exemplary embodiment will now be described. Reference is made to the accompanying drawings wherein.

Figures 1, 2, 3, 4, 5, 11:
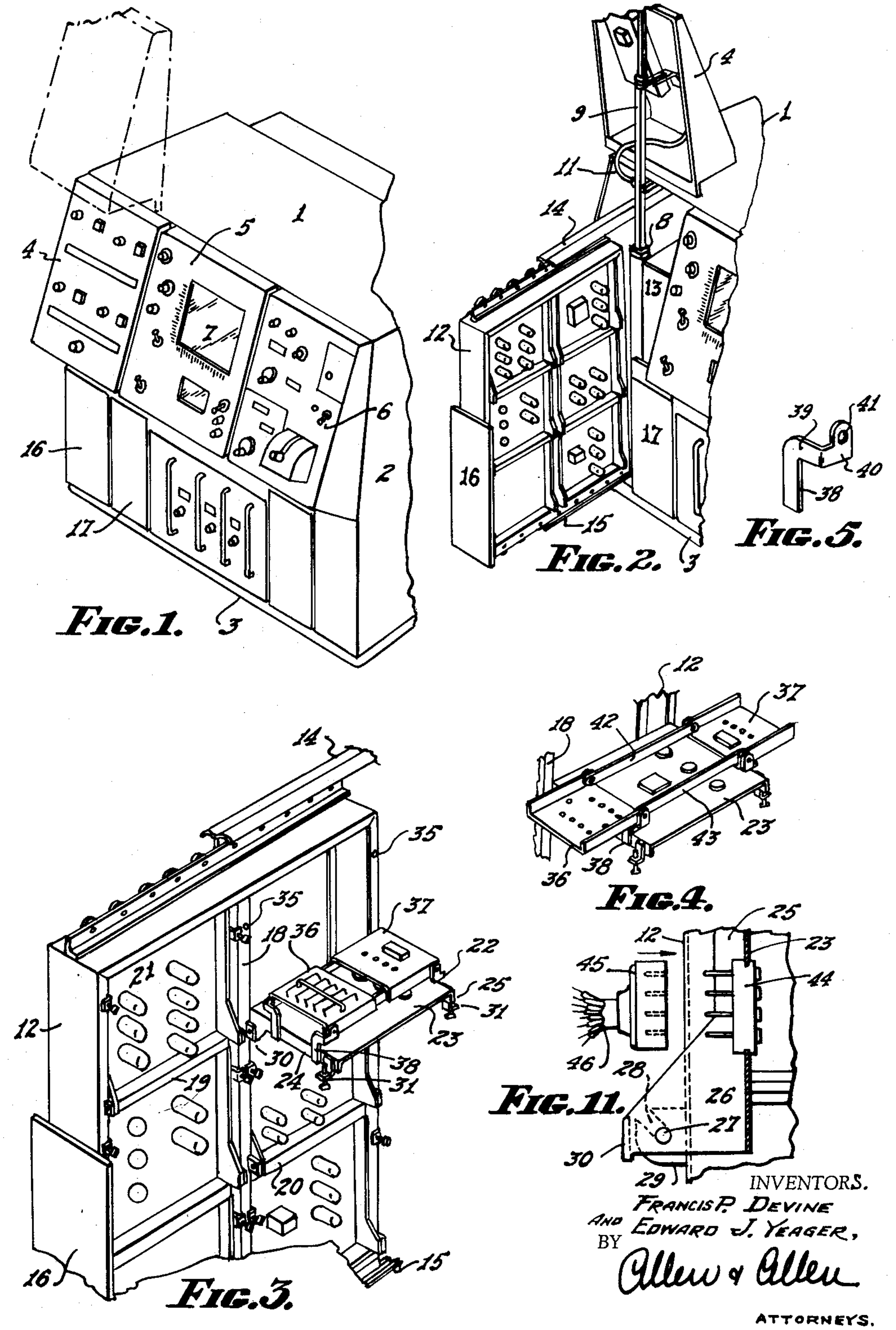
FIGURE 1 is a partial perspective view of a cabinet of the type above designated in closed condition.
FIGURE 2 is a partial perspective view of the same cabinet with one of the front panels raised and reversed, and one of the vertical frames withdrawn.
FIGURE 3 is a partial perspective view of a vertical frame, showing one of the chassis structures swung downwardly to a horizontal position.
FIGURE 4 is a partial perspective view showing a chassis structure in the same position but with supplementary platform members swung to an outward position.
FIGURE 5 is a perspective view of a mounting element for the supplementary platforms.
FIGURE 11 is a partial sectional view showing the use of a plug-in connector.

Referring first to FIGURES 1 and 2 there is shown a cabinet for electrical or electronic apparatus comprising a top 1, side members such as 2, a bottom 3, and a back element (not shown). The cabinet has certain front panel structures indicated at 4, 5 and 6. In the particular embodiment, these front panels carry electronic apparatus, and particularly controls which must be accessible to the operator of the apparatus, together with any indicating means, such as meters, a screen 7, oscillograph tubes and other elements which must be within range of the operator's vision. By means illustrated and described in the copending application referred to above, one or more of the front panel elements are arranged to be movable vertically to a position above the top 1 of the cabinet, as shown in dotted lines in FIGURE 1. Such means need not be specially herein described. They preferably comprise a column 8 mounted in the cabinet and containing a sliding rod 9 to which the front panel is mounted. The mounting is preferably a swivel mounting so that after being raised, the front panel may be turned around to the position indicated in FIGURE 2 whereby electrical and electronic apparatus on its rear becomes available. Such apparatus may be connected to other apparatus within the cabinet by means of a flexible multi-lead cable 11. Means are provided to exert upon the sliding rod 9 an upward force sufficient to counterbalance the weight of the front panel and its appurtenances.

When the panel 4 has been raised as indicated the front of the cabinet is uncovered in part rendering accessible a plurality of vertically disposed frames 12 and 13. These frames are designed to hold electrical or electronic apparatus mounted on a plurality of chassis structures as hereinafter set forth. The frames are mounted for forward and rear sliding movement, preferably by means of rollers on movable track elements 14 and 15. Where the front panel elements do not occupy the entire front of the cabinet, the vertical frames may be provided with panels 16 and 17 to assist in closing off the lower part of the front of the cabinet. In FIGURE 2 the vertical frame 12 is shown withdrawn from the cabinet.

A plurality of chassis structures are usually mounted in each frame. As shown in FIGURE 3 the frame may be provided with mullions 18, 19 and 20 arranged to divide the frame into a plurality of spaces each of which contains a chassis structure. A chassis structure in the normal vertical position is shown at 21 in FIGURE 3. The chassis structures are pivoted at the bottom to the frame or to a mullion so that they may be swung downwardly to a horizontal position as indicated at 22 in FIGURE 3. The various chassis structures are shown diagrammatically as carrying electrical or electronic circuit elements, the precise nature of which does not form a limitation on the invention.

An exemplary chassis structure comprises a main sheet metal platform 23, side elements of which are turned over as at 24 and 25 to contribute to the stiffness of the panel. As will be clear upon brief reference to FIGURE 11, the turned over portions 24 and 25 are provided at their lower ends with outwardly extending ears 26. A rod or shaft 27 extends across between the ears, where a slip-ring connector is used as hereinafter described. Otherwise a small, outwardly extending shaft portion can be attached to each ear. The projecting portions of the shaft 27 engage in slots 28 in brackets 29 affixed respectively to the frame 12 or to a mullion. This provides a hinged construction for the main platform of the chassis structure such that the structure may be swung from the vertical position shown in FIGURE 11 to the horizontal position shown in FIGURE 3. Out-turned lugs 30 on the ears are arranged to engage the frame and the mullion to keep the main platform from swinging downwardly beyond the horizontal position. Because of the slot 28, the shaft 27 may be entirely disengaged from the brackets 29, permitting bodily removal of the chassis structure from the frame.

Suitable locking means are provided to hold the panel in the vertical position. These may take various forms. A simple and adequate form is illustrated on the largest scale in FIGURE 8. An angular bracket 31 is formed from or attached to the turned over edge 25 of the panel, and a shaft 32 is journalled in a hole in the bracket. The shaft carries at one end a key head 33 or other means by which it may be rotated; and at its other end it bears a transverse pin 34. As shown in FIGURE 3 the edges of the frame 12 and the mullion 18 are provided with suitably positioned holes 35 which have connecting slots above and below. There is a locking means comprising a bracket 31 at each side of the main panel; and when the panel is swung to the vertical position the shafts 32 may be turned so as to enter the holes 35 with the respective pins passing through the slots. Then if the shafts are rotated a quarter turn by means of the key heads, the panel will be locked in the vertical position. It will be readily understood that by bending the metal of the frame and mullion adjacent the holes 35 a wedging action may be provided for tightening.

The main panel 23 of the chassis structure is employed for mounting electrical or electronic devices in any desired array, to which end it may be perforated as required, provided with insulative elements etc. In the preferred practice of the invention, however, each chassis structure comprises not only a main panel 23 but one or more supplementary panels 36 and 37. These supplementary panels are arranged to be swung from a position in which they overlie the main panel to another position in which they lie off-side the main panel (as shown in FIGURE 4), uncovering the main panel for working purposes and rendering accessible the undersides of the supplementary panels. The supplementary panels 36 and 37 are preferably made of sheet metal having a pair of opposed edges turned at right angles as will be clear from the drawings. Angular bracket structures, one of which is illustrated in FIGURE 5, may be employed for mounting and pivoting supplementary panels. The bracket structures each have a leg 38 adapted to be attached to one of the turned over edges 24 and 25 of the main panel, and angularly related portions 39 and 40, the latter of which has a projecting ear provided with a perforation 41 as shown. The brackets are affixed to the main panel, and the supplementary panels are pivoted thereto in a construction which will be clear from FIGURE 4. The pivoting means are preferably rivets passing through the holes in the brackets and corresponding holes in the turned-over edges of the supplementary panels. The rivets also engage metallic strips 42 and 43 which extend between opposite brackets and serve as supports for the supplementary panels when they are in the positions shown in FIGURE 3.

The supplementary panels are employed as chassis members for the mounting of electrical or electronic components which may be connected to the components on the main panel 23 by flexible leads so as to permit the described movement of the supplementary panels. When the supplementary panels are in the turned over condition as shown in FIGURE 3, they lie within the periphery of the main panel so as to be encompassed within the space formed by portions of the frame and mullions. The described structure permits the inclusion of a very much greater quantity of electrical or electronic equipment in a given space while preserving complete accessibility.

Since in the repair and replacement of the components of apparatus of the types to which the invention is addressed, the complete removal of a chassis structure will often be desired, the electrical leads from the chassis structure may be connected to the portion 44 of a separable connector mounted on the main panel 23 as shown in FIGURE 11. The other portion 45 of the separable connector may be provided with a flexible multi-lead cable 46 in connection with other apparatus in the assembly. However, a preferable construction is illustrated in FIGURES 6 to 10 inclusive. The rod 27 which is used to pivot the chassis structure in the brackets 29 is provided between the extensions 26 of the turned over edges of the main panel with a tubular insulative covering 47 upon which is mounted a series of laterally spaced metallic rings 48. The electrical components mounted on the main and supplementary panels may be connected to these rings individually by leads, one of which is shown at 49 in FIGURE 10. To coact with the rings, a series of contact brushes 50 are mounted on an insulative support 51 on a mullion such as 19 or on the frame 12. The brushes in this series are connected to electronic components or circuit elements located elsewhere in the assembly by leads, one of which is shown at 52 in FIGURE 10. The construction is such that the brushes will maintain contact with their respective rings so long as the ends of the shaft 27 are engaged in the slots in the ears 29 irrespective of whether the chassis structure lies in the vertical or the horizontal position. This makes provision for in-circuit work on the chassis structure in either position. Yet the chassis structure may be removed completely by merely lifting it so as to disengage the ends of the shaft 27 from the supporting ears. When this is done all electrical connections are automatically broken. When the same or a new chassis structure is put in place all electrical connections will be automatically re-established as will be clear.

Figure 6:
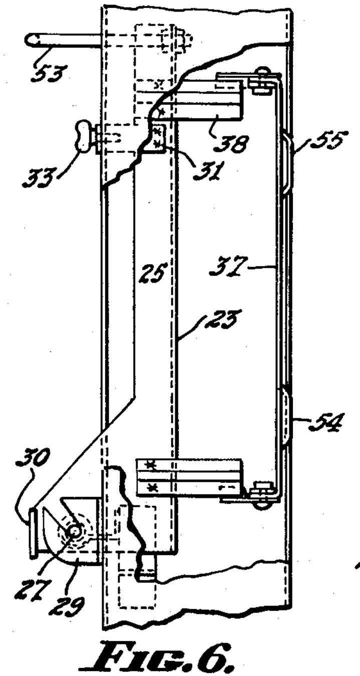
FIGURE 6 is an elevational view with parts in section of a chassis structure in the upright position.

As illustrated in FIGURE 6 the main panel of each chassis structure may be provided with a bail-shaped handle 53 to facilitate both the vertical and horizontal positioning of the chassis structure and its renewal and transportation.

Figure 7:
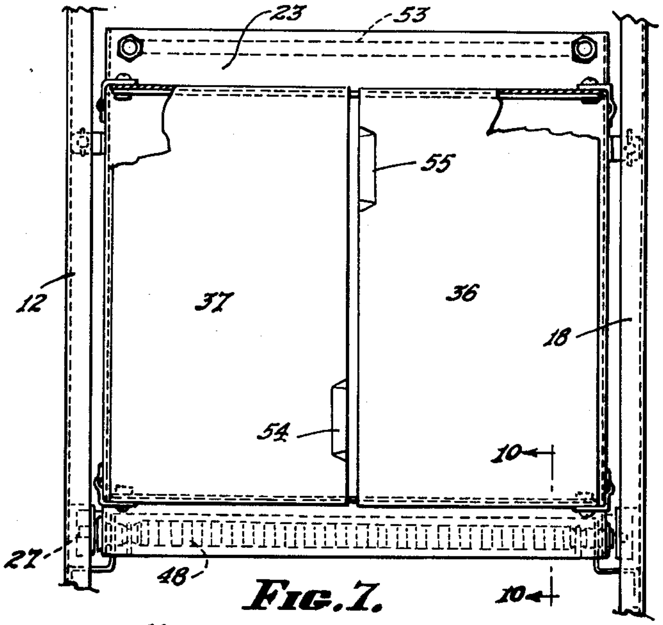
FIGURE 7 is a rear elevational view of a chassis structure in the upright position.
Figure 10:
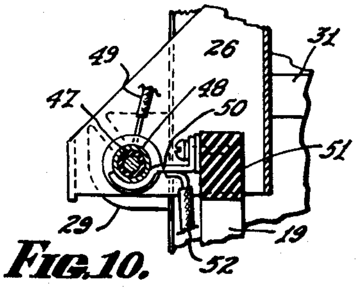
FIGURE 10 is a partial sectional view taken along the section line 10—10 of FIGURE 7.
Figure 8:
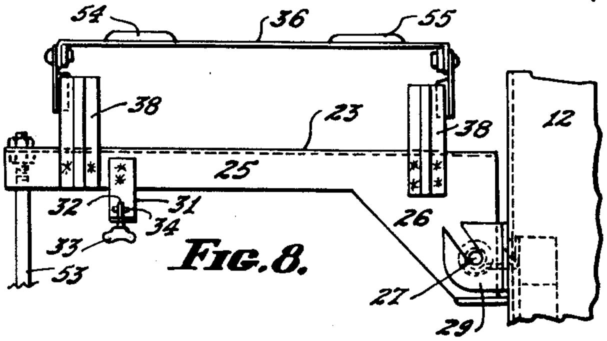
FIGURE 8 is a side elevational view of a chassis structure in the horizontal position.
Figure 9:
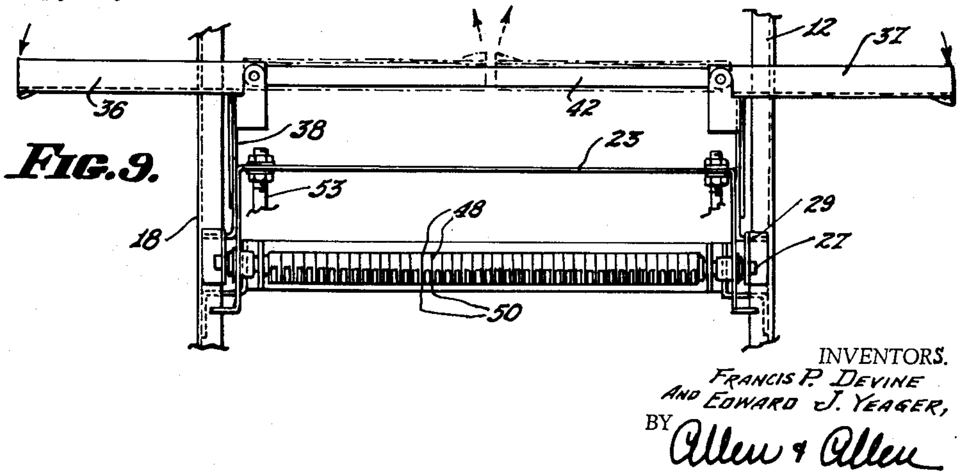
FIGURE 9 is a front elevational view of a chassis structure in the horizontal position.

As shown in FIGURES 7 and 8 the supplementary panels 36 and 37 may be provided with raised portions 54 and 55 which may be engaged by the fingers in moving the supplementary panels from the positon shown in FIGURE 7 to the position shown in FIGURE 9.

In various ones of the figures certain parts have been omitted for the sake of clarity. Thus the handles with which the chassis structures are preferably provided have not been illustrated in FIGURES 2 to 4 inclusive, while electrical or electronic components have not been shown as mounted on the respective panels in FIGURES 6 to 10 inclusive.

Modifications may be made in the invention without departing from the spirit of it. The invention having been described in an exemplary embodiment, what is claimed as new and desired to be secured by Letters Patent is:

1. In an electrical apparatus the combination of a vertical frame having elements defining a space for the reception of a chassis structure, and a chassis structure comprising a platform having edge portions disposed at an angle, said edge portions having extensions at one end, and means for pivoting said platform with respect to said frame, said means comprising a shaft passing through said extensions, end portions of said shaft being pivotally engaged in bracket members on said frame elements, said bracket members having slantwise disposed slots whereby the chassis structure may be detached and removed from said frame, and whereby said platform may be swung from a vertical position within said frame to a horizontal position projecting outwardly therefrom, said extensions having out-turned portions adapted to engage said frame elements to maintain the said horizontal position of said platform, said platform constituting a chassis and adapted to support electrical elements, the portion of said shaft lying between said extensions being covered with an insulative material and being provided with a plurality of laterally spaced conductive rings, the electrical elements on said platform being conductively connected to said rings, and a plurality of brushes insulatively mounted upon an adjacent frame element and located respectively to contact said rings, said brushes being adapted for connection to electrical circuit means whereby contact may be maintained with the electrical elements on said platform when said platform is in both the vertical and horizontal positions, all such electrical contacts being broken automatically when said chassis structure is removed from said frame.

2. In an electrical apparatus the combination of a vertical frame having elements defining a space for the reception of a chassis structure, and a chassis structure comprising a platform having edge portions disposed at an angle, said edge portions having extensions at one end, and means for pivoting said platform with respect to said frame, said means comprising a shaft passing through said extensions, end portions of said shaft being pivotally engaged in bracket members on said frame elements, said bracket members having slantwise disposed slots whereby the chassis structure may be detached and removed from said frame, and whereby said platform may be swung from a vertical position within said frame to a horizontal position projecting outwardly therefrom, said extensions having out-turned portions adapted to engage said frame elements to maintain the said horizontal position of said platform, said platform constituting a chassis and adapted to support electrical elements, at least one supplementary panel swingably mounted with respect to said platform and adapted to be moved from a position parallel to and covering at least a portion of said platform so as to lie within said frame when said chassis structure is in the vertical position, to another position in which said supplementary panel lies off-side of and uncovers said platform when said chassis structure is in the horizontal position, said supplementary panel being also adapted to support electrical elements.

3. In an electrical apparatus the combination of a vertical frame having elements defining a space for the reception of a chassis structure, and a chassis structure comprising a platform having edge portions disposed at an angle, said edge portions having extensions at one end, and means for pivoting said platform with respect to said frame, said means comprising a shaft passing through said extensions, end portions of said shaft being pivotally engaged in bracket members on said frame elements, said bracket members having slantwise disposed slots whereby the chassis structure may be detached and removed from said frame, and whereby said platform may be swung from a vertical position within said frame to a horizontal position projecting outwardly therefrom, said extensions having out-turned portions adapted to engage said frame elements to maintain the said horizontal position of said platform, said platform constituting a chassis and adapted to support electrical elements, the side portions of said platform carrying bracket elements, and a pair of supplementary panels having angularly related edges pivoted respectively to said brackets, said supplementary panels being swingable from a position in which they lie parallel to said platform and approach each other across a face of said platform, to a position in which they lie off-side said platform and expose its surface, said supplementary panels being also adapted to support electrical elements.

4. The structure claimed in claim 3 wherein metallic strips extend between said brackets in a position to engage and support said supplementary panels when said supplementary panels are folded inwardly over said first mentioned panel.

5. The structure claimed in claim 4 wherein that portion of the shaft between the extension on the angularly related edge portions of said main panel is covered with insulative material and is provided with laterally spaced electrically conductive rings, there being brushes insulatively mounted on an adjacent element of said frame and positioned to contact said rings respectively, said rings being connected to electrical elements on said panels and said brushes being connected to electrical circuit elements elsewhere so that contact is maintained in both the horizontal and vertical positions of said chassis structure, all such contacts being automatically broken when said chassis structure is removed from said frame.

6. In electrical apparatus, a cabinet, a vertical frame, means slidably mounting said vertical frame with respect to said cabinet so that said frame may be moved forwardly from a position within said cabinet to a position extending beyond the front portion of said cabinet, said frame having elements defining a space for the reception of a chassis structure, and a chassis structure comprising a platform for supporting electrical elements, said chassis structure being movable with respect to said frame from a vertical position in which it lies in said space and within said frame to a horizontal position in which it projects from said frame and is accessible for repair, and means for maintaining said chassis structure in both of said positions, said chassis structure including at least one supplementary panel member adapted to support electrical elements, such supplementary panel being movable with respect to said platform from a position in which it lies parallel thereto to permit the positioning of said chassis structure within said frame space, to another position in which it lies off-side said platform so as to permit access thereto when said chassis structure is in the horizontal position.

7. The structure claimed in claim 6 in which said frame is divided by mullions into a plurality of spaces for the acceptance of chassis structures, there being a chassis structure swingably mounted with respect to each such space.

8. The structure claimed in claim 7 wherein said chassis structures are removable from the said frame, said chassis structures having ring and brush connections with circuit elements elsewhere in said apparatus, said connections being effective in both the vertical and horizontal positions of said chassis structures, but being automatically broken upon the removal of a chassis structure from said frame.

References Cited in the file of this patent

UNITED STATES PATENTS

| | | |
|---|---|---|
| 2,152,589 | Haas | Mar. 28, 1939 |
| 2,185,562 | Nielsen | Jan. 2, 1940 |
| 2,740,944 | Harrison | Apr. 3, 1956 |
| 2,769,940 | Pettit | Nov. 6, 1956 |
| 2,849,661 | Oleson | Aug. 26, 1958 |
| 2,876,389 | Lang | Mar. 3, 1959 |